H. BURNETT.
NUT AND BOLT LOCK.
APPLICATION FILED AUG. 4, 1915.

1,199,448.

Patented Sept. 26, 1916.

Witnesses
Arthur K. Moore
H. M. Test

Inventor
H. Burnett.
By Chandlee Chandlee
Attorneys

UNITED STATES PATENT OFFICE.

HARRISON BURNETT, OF SPENCERVILLE, OHIO.

NUT AND BOLT LOCK.

1,199,448.  Specification of Letters Patent.  Patented Sept. 26, 1916.

Application filed August 4, 1915. Serial No. 43,654.

*To all whom it may concern:*

Be it known that I, HARRISON BURNETT, a citizen of the United States, residing at Spencerville, in the county of Allen, State of Ohio, have invented certain new and useful Improvements in Nut and Bolt Locks; and I do hereby declare the following to be a full, clear, and exact description of the invention, such as will enable others skilled in the art to which it appertains to make and use the same.

This invention relates to improvements in nut and bolt locks.

One object of the invention is to provide a novel and simple locking device for holding a nut against retrograde or forward movement on the bolt.

Another object is to provide a locking device which is not only simple but cheap in construction and which is easy of operation whereby it can be thrown into and out of operative position without the use of specially constructed tools.

Another object is to provide a locking device with novel means coöperating with means on the bolt for preventing the removal of the locking device.

Other objects and advantages will be apparent from the following description when taken in connection with the accompanying drawing.

Figure 1:
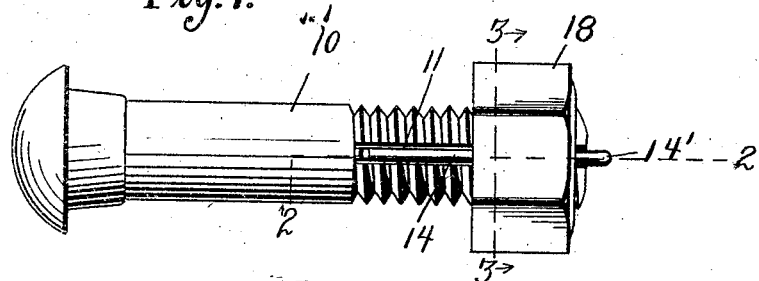
Figure 2:
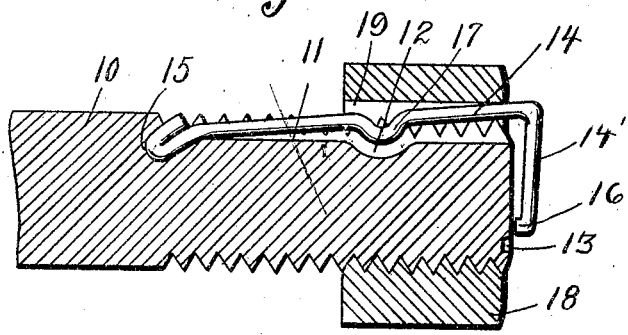
Figure 3:
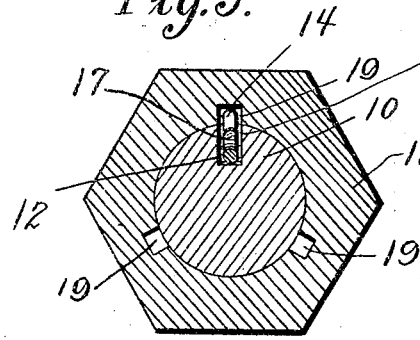
Figure 4:
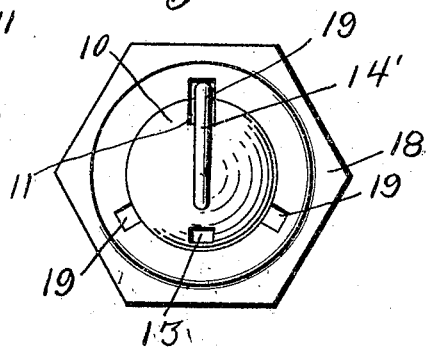

In the drawing: Figure 1 is a plan view of a bolt and locking device made in accordance with my invention, Fig. 2 is a longitudinal sectional view on the line 2—2 of Fig. 1, Fig. 3 is a transverse section on the line 3—3 of Fig. 1, and Fig. 4 is an end view of the bolt and nut.

Referring particularly to the accompanying drawing, 10 represents a bolt which is formed with a longitudinal groove 11. In the bottom wall of this groove, and adjacent the outer end thereof, there is formed a depression 12, the purpose of which will appear later. In the outer end of the bolt and at the opposite side from the groove is formed a notch 13. Disposed within the groove is a straight spring 14, the inner end of which is secured within a recess 15 formed in the inner end of the groove. The outer end of the spring is extended across the outer end face of the bolt, and in an inclined direction with respect thereto, as shown at 14′, the terminal being directed inwardly toward the end face of the bolt as at 16, where it engages with the notch 13 before-mentioned. Intermediate the ends of the spring there is formed a bend 17 which seats itself in the depression 12 when the terminal 16 engages in the notch 13.

Engaged on the bolt is a nut 18 in the wall of the opening of which there are formed the longitudinally extending grooves or channels 19.

Before the nut is applied to the bolt, the terminal 16 is engaged in the notch 13 so as to hold the body of the spring within the groove 11, and out of the line of the threads of the bolt. The nut is then screwed on to the bolt as far as desired, after which the terminal 16 is released from the notch 13 by pulling in a direction longitudinally away from the bolt. The resiliency of the body portion of the spring causes the same to swing outwardly and engage in one of the grooves or channels 19 in the nut. Thus the nut is held against rotation in either direction. To release the nut, it is only necessary to press the spring away from the nut and engage its terminal in the notch 13.

When the device is in unlocked position the bend 17 remains in engagement with the walls of the recess 12, or in close proximity thereto, so that should an attempt be made to pull the spring longitudinally through the groove 11, from the end of the bolt, this bend would engage with the wall of the recess and effectively hold the same against movement. It will be seen that this bend fits snugly within the recess when the device is in unlocked position.

What is claimed is:

1. In a nut lock a bolt having a longitudinal groove in the threaded portion thereof, a longitudinal spring member disposed in the groove and secured at one end to the inner end wall of the groove, the outer end of the bolt being formed with a notch, a projection carried by the outer end of the spring for engagement in the notch, the bottom wall of the groove being formed with a depression, and the spring being formed with a bend for engagement in the recess to hold the spring against longitudinal disengagement.

2. The combination with a bolt having a threaded portion provided with a longitudinal groove and a nut having a series of grooves spaced around the opening therein; said bolt being provided at the inner end of its groove with a recess directed inwardly and away from the threaded portion of the bolt and a notch intermediate its ends and being provided further with a recess extending inward from the end face of the bolt and located diametrically opposite the groove, and a locking device consisting of a length of spring wire having one end doubled and forced into the first-mentioned recess, the body of the wire extending along said bolt and having its free portion adapted to move into and out of the groove and being bent to enter the notch and the extremity of the wire being bent to lie across the end of the bolt and being provided with a downwardly turned portion engaging in the second recess when the free part of the body of the wire is moved into the groove of the bolt.

In testimony whereof, I affix my signature, in the presence of two witnesses.

HARRISON BURNETT.

Witnesses:
R. R. KENNEDY,
MARCUS BURNETT.